United States Patent [19]
Sheldon

[11] Patent Number: 5,010,240
[45] Date of Patent: Apr. 23, 1991

[54] COMPOSITE TICKET PROCESSING UNIT

[75] Inventor: Dunstan P. Sheldon, Altadena, Calif.

[73] Assignee: Mag-Tek, Inc., Carson, Calif.

[21] Appl. No.: 336,401

[22] Filed: Apr. 11, 1989

[51] Int. Cl.[5] ..................... G06K 5/00; G06K 7/00; G06F 15/20; B26D 7/06

[52] U.S. Cl. ..................... 235/382; 235/375; 235/380; 235/440; 235/482; 83/102; 83/102.1

[58] Field of Search ............... 83/102.1, 107; 235/382, 235/384, 440, 482, 375, 376, 380

[56] References Cited

U.S. PATENT DOCUMENTS

| | | | |
|---|---|---|---|
| 3,580,121 | 5/1971 | Asada et al. | 83/107 |
| 3,874,650 | 4/1975 | Steigerwald et al. | 235/475 |
| 4,086,475 | 4/1978 | Churchill | 235/382 |
| 4,357,530 | 11/1982 | Roes et al. | 235/384 |
| 4,672,661 | 6/1987 | Clark, Jr. et al. | 235/482 |
| 4,684,792 | 8/1987 | Nickels, Jr. | 235/482 |
| 4,788,420 | 11/1988 | Chang et al. | 235/483 |
| 4,798,942 | 1/1989 | Aubrey | 235/483 |
| 4,882,473 | 11/1989 | Bergeron et al. | 235/375 |

*Primary Examiner*—Stuart S. Levy
*Assistant Examiner*—Edward H. Sikorski
*Attorney, Agent, or Firm*—Nilsson, Robbins, Dalgarn, Berliner, Carson & Wurst

[57] ABSTRACT

An off-line terminal, located at an airline boarding gate processes composite tickets bearing a magnetic stripe. Processing includes: authenticating, verifying, recording, canceling, bursting into component sections and sorting. Operations are controlled, logged and interrelated in accordance with ticket content and operating programs. Structurally, a processing computer cooperates with magnetic stripe transducers, a printer, a burster, signal lamps and a plurality of document-direction gates to select and control the path of individual ticket components. An additional magnetic sensor for ticket components (e.g. boarding passes) enables control of passenger movements after initial clearance with ticket processing.

10 Claims, 3 Drawing Sheets

COMPOSITE TICKET PROCESSING UNIT

BACKGROUND AND SUMMARY OF THE INVENTION

The present invention relates to document processing systems and specifically to a ticket system, as for processing transportation tickets and boarding passes with attendant passenger control.

Traditional airline tickets comprise multiple-sheet bundles, each sheet for a flight leg and bearing various data, as passenger name, flight number, departure and destination locations, flight time and so on. Such traditional ticket sheets as conventionally used are susceptible to misuse, yet impose substantial inconvenience to passengers and require considerable attention by airline personnel. Recognizing the problem, government agencies and private groups have sponsored development efforts to enhance airport security while reducing passenger inconvenience. Among other suggestions, an improved ticket has been suggested, formed of card stock for ease of processing, bearing a magnetic stripe and including a boarding pass. It also has been proposed that data regarding the passenger, the airline, the flight number and so on be printed on the sheet and recorded on the magnetic stripe. The magnetic stripe also could be encoded with data relating to the passenger's location and the status of the passenger's baggage. While such a ticket format offers various possibilities, a need exists for an economical ticket-processing unit capable of rapidly, easily and accurately processing the ticket sheets while enabling enhanced airport security with relative passenger convenience.

In general, the present invention comprises a ticket-processing system for processing composite, separable (severable) sheets or documents, as for example, sheets including an airline passenger ticket and a boarding pass, which sheets bear a magnetic stripe to facilitate control and processing. Within the system, sheets are moved along select paths as for magnetic transducing and related operations of printing, bursting, canceling and sorting. A range of selective operations enables the use of a single unit to effectively process tickets at a point of entry as a boarding gate. Other operations include rejection, special processing and boarding-pass monitoring.

DESCRIPTION OF THE ILLUSTRATIVE EMBODIMENT

A detailed illustrative embodiment of the present invention is disclosed herein; however, it is merely representative, recognizing that terminal designs, programming, document handlers and other components themselves may be embodied in a wide variety of forms, some of which may be quite different from those of the disclosed embodiment. Consequently, the specific structural and functional details disclosed herein are merely representative, yet in that regard they are deemed to afford the best embodiment for purposes of disclosure and to afford a basis for the claims herein which define the scope of the present invention.

Figure 1:
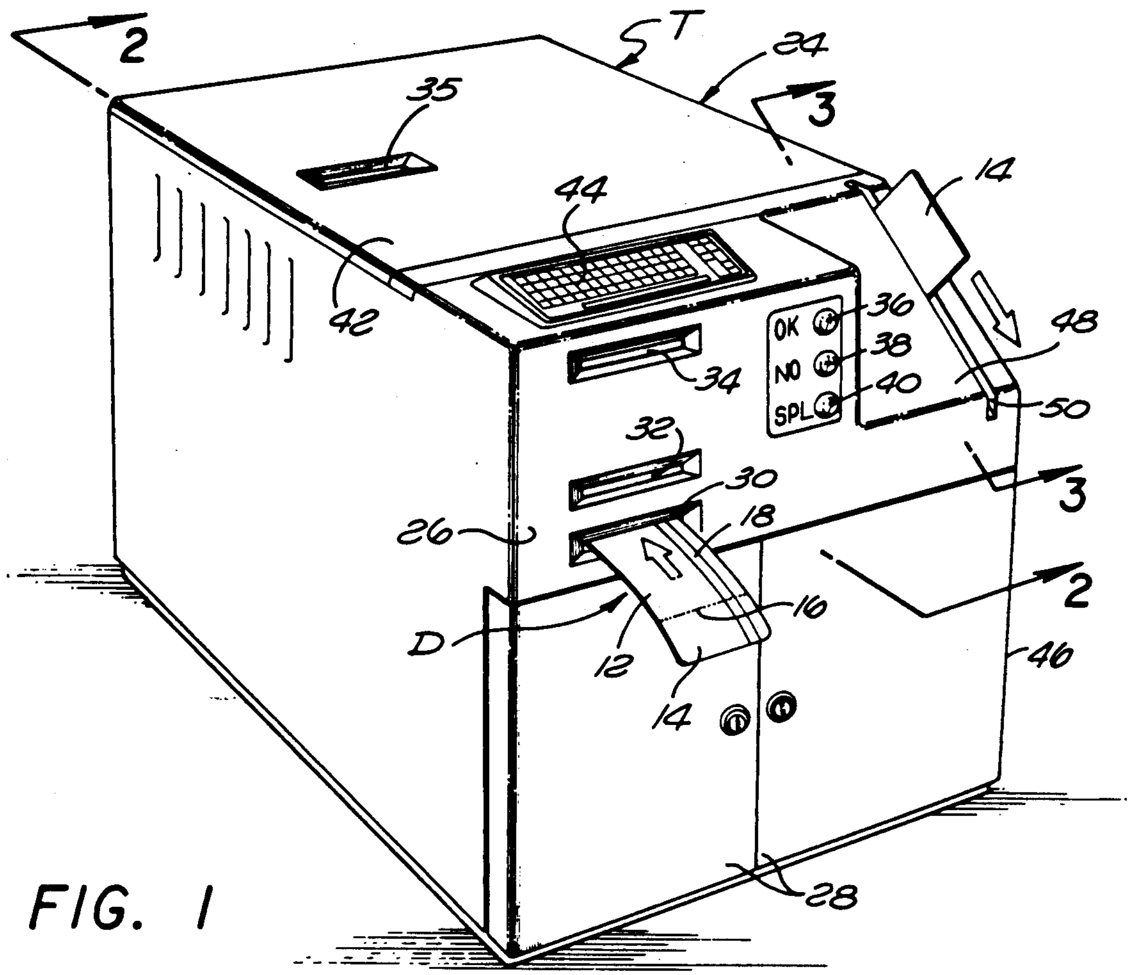
FIG. 1 is a perspective view of a unit incorporating the system of the present invention.

Referring initially to FIG. 1, a terminal unit T in accordance herewith is illustrated receiving a sheet or ticketing document D. In routine operation, the unit T authenticates the document D, verifies the flight, updates the magnetic stripe, separates the document into a ticket and a boarding pass, cancels the ticket and returns the boarding pass. Additionally, the unit T incorporates structure for sorting tickets and verifying boarding passes. Accordingly, passenger movements are controlled and monitored.

Considering the document D in somewhat greater detail, the major section 12 of the card stock sheet constitutes a passenger ticket. The smaller section 14 constitutes a boarding pass (which may incorporate a baggage check). The two component sections are joined along a perforation line 16. The document D carries a magnetic stripe 18 offset from an elongate edge (right). Printed indicia (not shown) on the document indicate general provisions and specific details of the ticket.

Functionally, the terminal unit T senses the magnetic stripe 18 to authenticate and verify the ticket, rewrites the stripe, then cancels the ticket section 12, separates the sections 12 and 14, selectively captures the sections 12 and returns the section 14. Thus, at a boarding gate, ticket sheets are tested, updated, canceled and sorted, with boarding passes returned to passengers for subsequent use.

The terminal unit T is contained in a generally parallelepiped housing 24 with operating components in the forward end panel 26 as illustrated. Above a pair of access doors 28 (lower front) entry port 30 receives documents D as illustrated. If a received document is unacceptable for the flight, it is returned through a reject port 32 located just above the port 30. Acceptable documents are processed and the boarding-pass section 14 is returned in accordance with a program, either through an exit port 34 or a similar port 35 aligned above the ports 30 and 32.

The final operation with respect to each specific document D is indicated by signal lamps 36, 38 and 40 aligned at the upper center of the panel 26. Specifically, the "OK" signal lamp 36 indicates a routine processing operation in which an acceptable ticket is canceled, captured and stored with the boarding pass being returned to the passenger. The "NO" signal lamp 38 manifests a rejected ticket document, and the "SPL" signal lamp 40 indicates a special ticket. The "NO" signal essentially is an instruction to take the ticket to an agent, who has detailed information. Essentially, special tickets are identified for separate treatment or storage. Note that the electrical signals for the lamps 36, 38 and 40 may be utilized to control passenger movements. For example, a turnstile gate may be controlled to permit entry by a passenger only if the ticket is acceptable.

Considering other external features of the terminal T, a keyboard 44 is mounted at the forward end of the top panel 42. Generally, the keyboard 44 is used to indicate specific flights and similar information for a program to authenticate and verify individual tickets received in the terminal unit T. Various control and special record operations may also be specified by use of the keyboard 44.

As shown at the right side 46 of the unit T, a bevelled panel 48 defines a slot 50. A boarding-pass section 14 is shown passing through the slot 50 to confirm the propriety of the passenger to be in a boarding area. That is, after a passenger's ticket has been captured (upon entrance to a boarding area) the passenger may be permitted to leave. Permission to return is then conditioned on the passenger presenting a boarding pass authenticated by movement through the slot 50 to illuminate the "OK" lamp 36. The various detailed operations are described below, however, preliminary reference will now be had to FIG. 2 showing the paths for documents moving within the terminal unit T.

Figure 2:
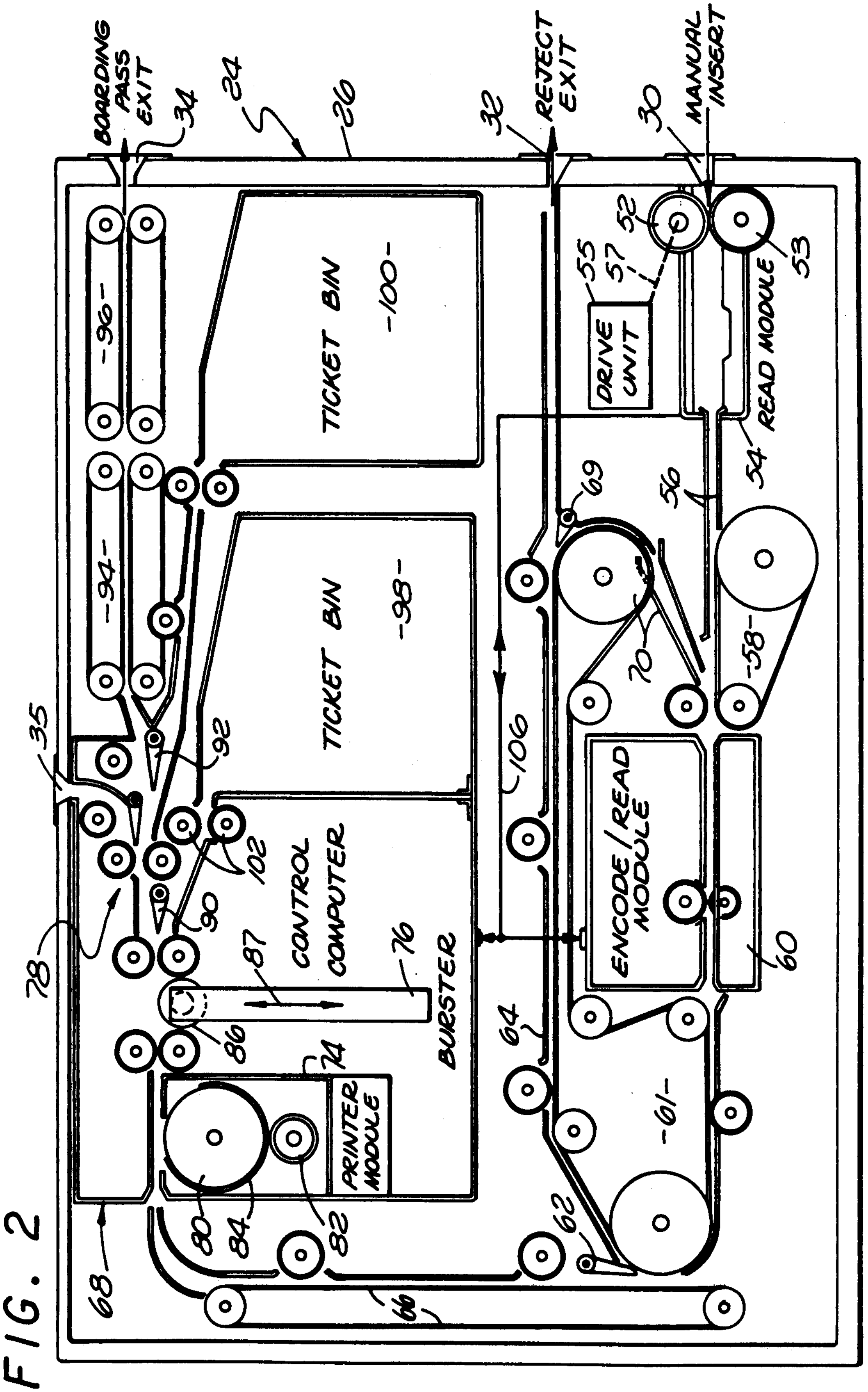
FIG. 2 is a vertical cross-sectional view taken along the line 2—2 of FIG. 1.

In FIG. 2, the ports 30, 32 and 34 (right) are shown in the front panel 26 of the housing 24. Documents D inserted through the entry port 30 are received between an initial pair of drive rollers 52 and 53 which move the document D through a read module 54 to sense the magnetic stripe 18. The roller 52 is turned by a drive 55 as indicated by a dashed line 57. The drive 55 is also coupled to several other document movers as described in detail below. However, to preserve the clarity of FIG. 2, such connections are not illustrated.

Moving to the left from the read module 54, as illustrated, documents D are received by guides 56 which steer them to a carrier belt mechanism 58 for delivery to an encoder-reader module 60. The module incorporates magnetic read and write heads (not shown) as well known in the art. Thus, the magnetic stripe 18 (FIG. 1) on documents D is sensed and recorded.

Passing from the module 60, documents D next encounter rollers and guides 61 after which they are directed to one of two paths by a gate 62. Depending on the position of the gate 62, documents D are passed either: to a return track 64 or to a carrier belt 66. From the return track 64, documents are either passed to the exit port 32 or returned to the module 60, depending on the position of the gate 69. Returning to the module 60, documents are driven by a mechanism 70.

If documents are directed by the gate 62 to the computer 68 on the belt 66, they have tested to be acceptable. Such documents are further processed in the computer 68 which incorporates mechanisms as well as control electronics. Generally, documents D supplied to the control computer 68 may be canceled by a printer module 74, severed by a burster 76 then sorted by a segregation mechanism 78.

The printer module 74 in the disclosed embodiment comprises a print roller 80 along with an engaging ink roller 82. The print roller 80 is simply a cylinder bearing a spiral riser 84 to imprint a diagonal stripe on passing ticket documents. Of course, various other cancellation devices or printers may be utilized depending upon specific objectives and procedures.

The burster 76 may comprise a simple solenoid-actuated mechanism incorporating a roller 86 tapered to separate or sever documents D along the perforation 16 (see FIG. 1). Reciprocal motion by the roller 86 as indicated by a double arrow 87 severs documents D along the perforation 16 (FIG. 1). A form of burster suitable for use in the system of the present invention is disclosed in U.S. Pat. No. 4,454,973.

From the burster 76, documents D enter the segregation mechanism 78 for guided movement to any one of four paths. Note that at this point, the document D actually comprises two separate sections 12 and 14. Typically, the boarding pass section 14 is lifted by both the gates 90 and 92 to pass through the carrier belts 94 and 96 and exit from the port 34. Following a different path, the ticket sections 12 are sorted, moving either to a first ticket bin 98 or a second ticket bin 100. Specifically, the gate 90 (with associated rollers 102) directs ticket sections 12 to the bin 98. Conversely, in the alternate position, the gate 90 shuttles ticket sections 12 to the gate 92 which directs the sections into the bin 100.

Figure 3:
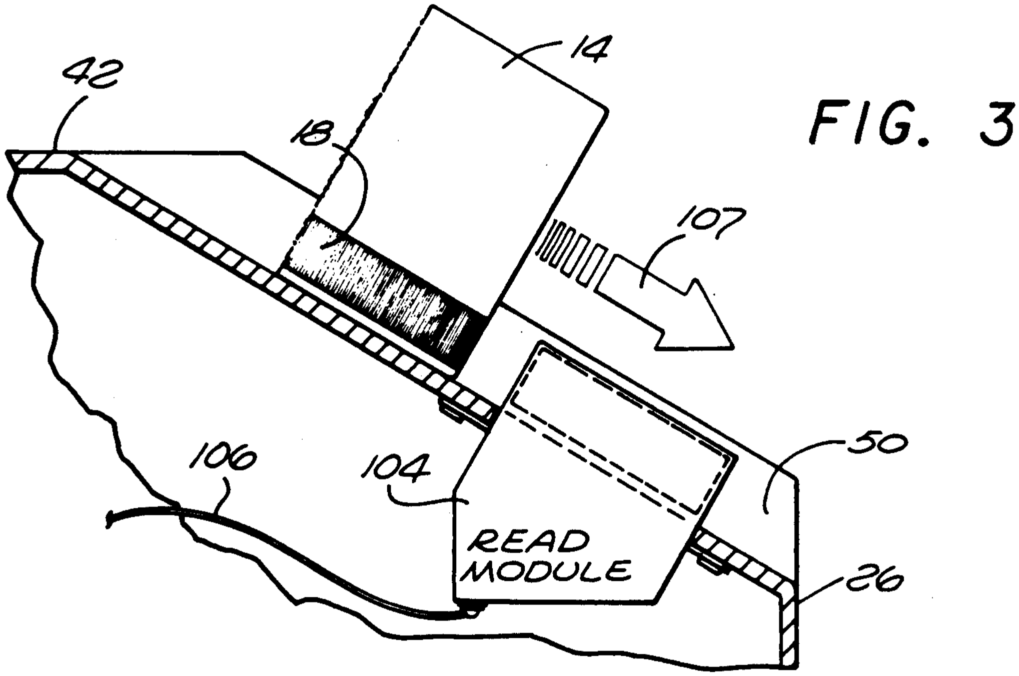
FIG. 3 is a fragmentary vertical crosssectional view taken along line 3—3 of FIG. 1.

The mechanical system as described above with respect to FIG. 2 is controlled by the computer 68 depending on data provided from the read module 54, the encode-read module 60 and a read module 104 (FIG. 3). The read module 104 senses boarding-pass sections 14 to accommodate re-verification of passengers. As illustrated in FIG. 3, the sections 14 are simply drawn manually through the slot 50 as indicated by an arrow 107. As a consequence, the magnetic stripe 18 passes the module 104 for sensing. The electrical elements of the system are interconnected by a cable harness 106 (FIG. 3, also indicated in FIG. 2). Accordingly, the system accomplishes various control functions under specific circumstances as described in detail below. Preliminarily, a basic illustrative format for data carried by the magnetic stripe 18 is treated.

Generally regarding the magnetic stripe 18, it is to be appreciated that the content and format may vary widely depending on specific applications and objectives. Typically, in airline applications the magnetic stripe data would be fully captured, as for accounting and processing. However, for purposes of explanation an exemplary format herein simply carries basic information as follows:

| Ticket No. | Flight | Date | Dest. Code | Status | Auth. Code |
|---|---|---|---|---|---|
| 1537682146 | 803 | 61087 | 12124 | 01 | 413 |

The information is located on the portion of the magnetic stripe 18 that lies on the ticket section 12: Part of the information is duplicated on the magnetic stripe 18 portion located on the boarding-pass section 14. In the exemplary format, the portion of the magnetic stripe 18 carried on the boarding pass 14 may omit the ticket number and the destination code.

Considering the data in further detail, the ticket "number" identifies the specific ticket embodied by an individual document D. The "flight" data indicates the designation of the flight for which the ticket is valid on the date as indicated by the "date" and with a destination as indicated by the "destination code". The "status" is a two-bit binary numeral representing status as follows:

| Code | Status |
|---|---|
| 00 | Valid uncanceled ticket |
| 01 | Canceled ticket |
| 10 | Void ticket |
| 11 | Special ticket |

The "authentication code" is encrypted as an anticounterfeit technique. For example, the code might be encrypted from "flight", "date" or "destination" data. Of course, various codes may be used as well as various forms of anticounterfeit techniques.

Considering the general operation of the system, inserted tickets are sensed by the read module 54 for the data on the magnetic stripe 18. With that data, the control computer authenticates the ticket and verifies that the flight, date and destination are proper. The status of the ticket is also checked. If the ticket is indicated to be proper, the magnetic stripe is updated, changing the status of the ticket and perhaps modifying the authentication code. The ticket section 12 is marked to be canceled then captured and the boarding pass section 14 is returned for the passenger. The "OK" signal is illuminated.

Figure 4:
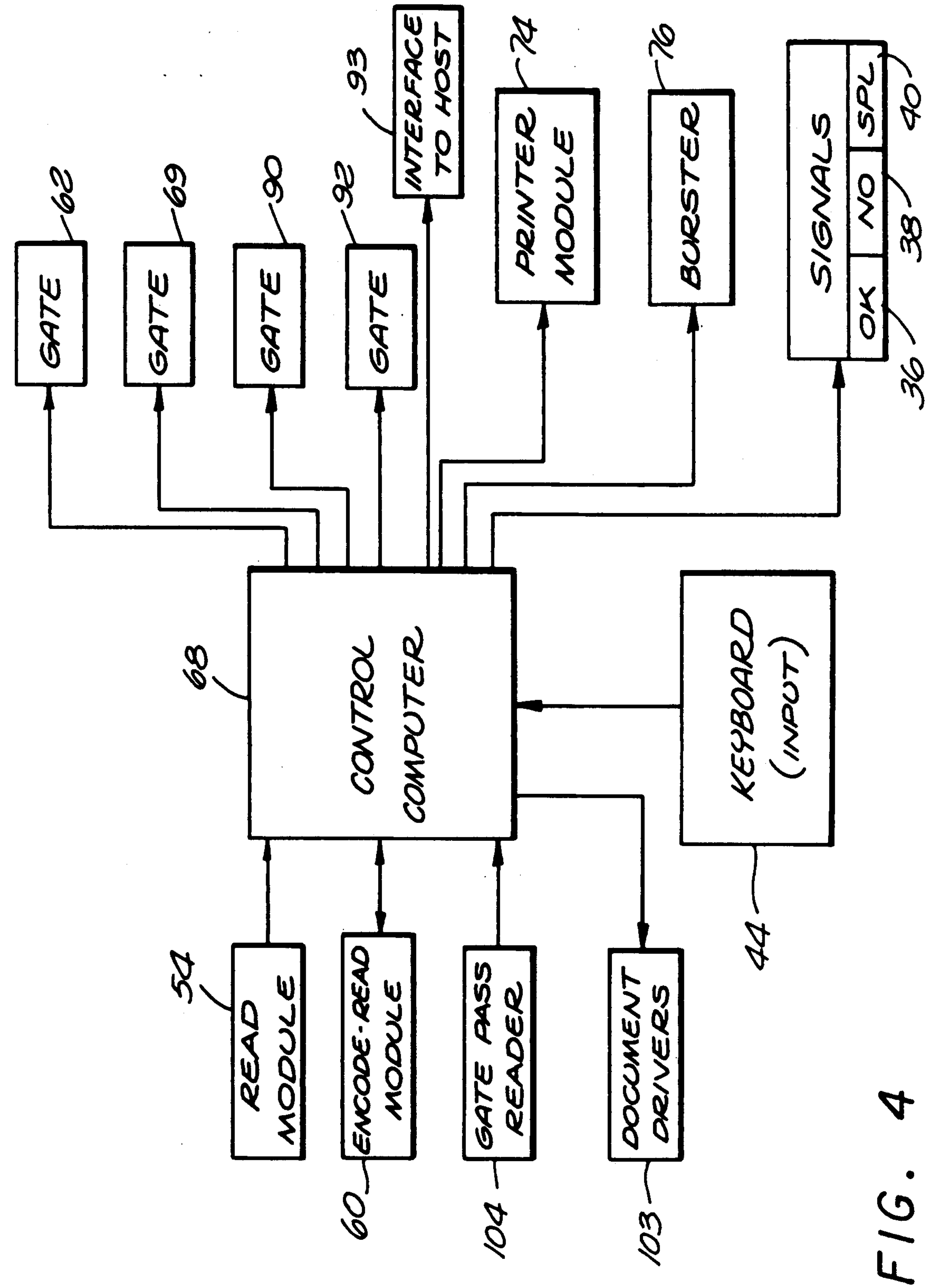
FIG. 4 is a block diagram of the operating electrical components in the system of FIG. 1.

To now accomplish a comprehensive understanding of the disclosed embodiment, various conditions will be assumed with the resulting operations described referring to the mechanical figures and the block diagram of FIG. 4. That is, FIG. 4 illustrates the components in an electrical block diagram for convenient reference and explanation. FIG. 4 also illustrates a computer interface 93 which may be used to accommodate on-line operation of the unit.

For purposes of explanation, assume initially that the terminal unit T (FIG. 1) is to be used for Flight 803 on June 10, 1987, destination Los Angeles. In accordance with various remote-terminal techniques as well known, the unit may be preliminarily programmed from a host computer (not shown) through the interface 93. In that regard, for example, the unit may be programmed to return boarding passes either through port 34 or 35 depending on boarding circumstances and the nature of the flight. Other on-line operations may include programming a further element of approval in which the numbers of any tickets which might have been voided (lost or stolen) may be registered. That is, the ticket numbers of voided tickets may be registered to indicate a negative list against which individual tickets are tested.

Pursuing the illustrative example, the operator actuates the keyboard 44 (FIGS. 1 and 4) to register the flight number, the date and the destination code for comparison approval of all presented tickets. Additionally, the keyboard 44 is actuated to register the acceptable authentication codes for similar comparisons..

With the system programmed for a specific flight, next assume the presentation of an acceptable conventional ticket document D. The insertion of the document D through the port 30 (FIGS. 1 and 2) is sensed by the read module 54 (FIG. 2) incorporating a sensor as well known in the prior art. Consequently, the various document drivers (FIG. 2, rollers 53 and so on) are energized to grasp and move the document D. Note that the document drivers as described in detail above are collectively represented in FIG. 4 by a block 103.

As the document D moves through the read module 54, the magnetic stripe 18 is read to provide the data as described above. Representative signals are sent through an electrical cable 106 (FIG. 1) to the control computer 68 (FIGS. 1 and 4). Certain document data ("flight", "date", "destination" and "status") is verified by a coincidence test. The "ticket number" data is tested against a negative list. Authentication is performed by testing the "authentication code".

If the authentication and verification tests are positive, control signals are provided by the control computer 68 to process the ticket. Specifically, the encoder/read module 60 rewrites the magnetic stripe (on both sections 12 and 14) to status "01" (canceled ticket). As rewritten, the stripe 18 is read and confirmed by the control computer 68.

A test approval also prompts the control computer 68 to actuate the gate 62 (FIGS. 2 and 4) directing the ticket along the carrier belt 66 and into the control computer 68. The printer module 74 (FIGS. 2 and 4) is actuated to visually cancel the ticket. Similarly, the burster 76 (FIGS. 2 and 4) is also actuated separating the ticket document D into the sections 12 and 14. As the ticket is routine, the control computer 68 actuates the gate 90 (FIGS. 2 and 4) to direct the section 12 into the bin 98. Conversely, had the ticket been designated as special (status "11"), the gates 90 and 92 would have been set to direct the section 12 into the bin 100.

Immediately following the ticket section 12, the boarding pass section 14 is directed by the gates 90 and 92 (set by the control computer 68) to the carrier belts 94 and 96 delivering the boarding pass at the exit port 34. Thus, the ticket document D is authenticated, verified, checked with respect to the specific flight and canceled. The ticket section 12 is captured and the boarding-pass section 14 is returned to the passenger. As a final event, the "OK" signal 36 (FIGS. 1 and 4) is illuminated to further indicate the propriety of the ticket.

For certain operations of the system, including the routine acceptance as described above, the mechanical gates 62, 69 and 90 are variously set. For convenience, certain of the operations, the related results and gate settings are summarized below.

| Operation | Description of Results | Gate Status |
|---|---|---|
| Routine Acceptance | Read document, signal acceptance, cancel ticket, separate ticket and boarding pass, capture ticket in routine bin, return boarding pass. | 62 - right<br>90 - raised |
| Special Acceptance | Read document, signal special, cancel ticket, separate ticket and boarding pass, collect ticket in special bin, return boarding pass. | 62 - right<br>90 - lowered |
| Reread | Reread document, depending on results of reread proceed with alternate operation. | 62 - left<br>69 - raised |
| Reject | Reject and return document, signal rejection. | 62 - left<br>69 - lowered |

In the operations as described and summarized above, a "special" status ("11") may be included. Essentially, "special" tickets are simply illustrative of various possibilities and might represent company passes, restricted fares or any of a variety of special-case tickets that are to be identified and sorted. Upon the presentation of such a ticket, which is otherwise valid, the operations are similar to those described above except for the action of the control gates 90 and 92 which direct the ticket section 12 of the document. In the case of special tickets, the ticket section 12 is directed to the ticket bin 100.

On presentation of an unacceptable ticket, the control computer 68 actuates the gates 62 and 69 to move the ticket along the track 64 and then through the reject port 32. In that event, personal attention is required to determine a course of action regarding the document D. The event is manifest by a "NO" signal 38 indicating the need for an agent if the ticket is to be urged further.

Another alternative involves a document D which, upon sensing or recording is not conclusively proper for the flight. For example, there may be some question in the logic of the control computer 68 with regard to the sensed data manifest by one of the modules 54 or 60. In such an event, a reread operation is commanded by actuating the gates 62 and 69 (FIGURES 2 and 4) to circulate the document D along the track 64 back to the encode-read module 60. If a second reading of the magnetic stripe is not conclusive as evaluated by the control computer 68, the ticket document D will be rejected. Of course, in the event of a reject, the "NO" signal 38 is actuated positively indicating that occurrence.

In a typical aircraft boarding procedure using the present system, as passengers are cleared by the terminal unit T, they enter a boarding area preparatory to boarding. In such a situation, it is not uncommon for a passenger to express the desire to leave the boarding area and subsequently return. Such requests are vexing to airline personnel if access to the boarding area is controlled. However, the system as disclosed herein facilitates such a request by providing an effective check of the boarding pass section 14 retained by passengers. On return to the boarding area, the boarding pass section 14 of a passenger's ticket is passed through the slot 50 as indicated in FIGURES 1 and 3. As a consequence, the read module 104 senses the magnetic stripe 18 to provide data indicating the propriety of the passenger to be in the boarding area. Typically, the data would include the flight, the date and the status of a canceled ticket. If the sensed data prompted an acceptable test, the "OK" signal 36 would be actuated indicating that the passenger should be passed.

To consider another possibility, a passenger may desire to board an aircraft with a ticket that is valid and proper except for the time of use. The situation arises, for example, in the case of a passenger desiring to board an earlier flight than that indicated by his ticket. In such an event, if the passenger can be accommodated, the keyboard 44 is actuated to substantially update the magnetic stripe 18 of the document. Specifically, the keyboard 44 provides data to the control computer 68 for driving the encode-read module 60 so as to rewrite the ticket for altered use.

It will be apparent that the system of the present invention also may incorporate various other functions as seat-check operation. For example, a look-up table may be incorporated in the control computer 68 identifying all of the available seats in the aircraft. As tickets are processed indicating specific seat assignments, the look-up table is addressed and seats are checked off. In the event of a duplicate, attendant personnel can rectify the awkward situation before a confrontation occurs. As a related consideration, the look-up table affords a convenient source of information on unoccupied seats which might be given to stand-by passengers at the last moment before departure of the aircraft.

It will be apparent that the system of the present invention is capable of economical implementation in a variety of forms using various components and structures to accomplish an effective, economical processing system for use in association with transportation tickets. As indicated, many program variations are possible to accomplish specific operations, checks and security measures, all while utilizing forms of the invention as set forth. Accordingly, the scope of the present invention is deemed to be appropriately determined by the claims as set forth below.

What is claimed is:

1. A terminal for processing composite documents severable into plural sections, as including a ticket and a pass, said documents having a machine-readable record as a magnetic stripe, said terminal comprising:

a housing defining a document input port, at least one exit port, at least one collection bin, and a channel slot for guiding the movement of a passing document section;

document track means affixed in said housing to transport document sections from said input port alternatively to a collection bin or an exit port;

a sensor fixed in said housing in the proximity of said track means to read and process data from said document sections;

a document burster affixed contiguous to said track means at a location beyond said sensor for separating said document into sections;

a second sensor affixed contiguous to said channel slot to read and process one of the document sections separated by the burster as it passes through said channel slot; and a control unit connected to said first and second sensors to control said track means, said burster and to provide indications of document acceptability.

2. A terminal according to claim 11 further including a printer to selectively mark one of said document sections under control of said control unit.

3. A terminal according to claim 11 further including a plurality of collection bins to selectively receive one of said document sections under control of said control unit.

4. A terminal according to claim 11 wherein said housing further defines a reject exit port to selectively return said documents under control of said control unit.

5. A terminal according to claim 11 further including indicator means controlled by said indications of document acceptability from said control unit.

6. A terminal according to claim 1 further including an interface for coupling to a host computer.

7. A terminal for processing composite documents severable into plural sections, as including a ticket and a pass, said documents having a machine-readable record as a magnetic stripe, said terminal comprising:

a housing defining document ports and a channel slot for guiding the movement of document sections;

track means affixed in said housing for transporting document sections as between said document ports;

a sensor fixed in said housing in the proximity of said track means to read data from said document sections;

document burster means affixed contiguous to said track means for separating documents into sections;

a second sensor affixed contiguous to said channel slot to read and process one of the document sections separated by the burster as it passes through said channel slot; and a control unit connected to said first and second sensors to control said track means, said burster and to provide indications of document acceptability.

8. A terminal according to claim 7 further including an encode-read means coupled to said control unit for selectively modifying the machine-readable records of said documents.

9. A terminal according to claim 7 further including a control keyboard for programming said control unit.

10. A terminal according to claim 7 wherein said document ports defined in said housing include a document input port for receiving said composite documents, a document rejection port for returning said composite documents, and a document section exit port for returning document sections.

* * * * *

UNITED STATES PATENT AND TRADEMARK OFFICE

CERTIFICATE OF CORRECTION

PATENT NO. : 5,010,240

DATED : April 23, 1991

INVENTOR(S) : Dunstan P. Sheldon

It is certified that error appears in the above-identified patent and that said Letters Patent is hereby corrected as shown below:

| Column | Line | |
|---|---|---|
| 4 | 37 | After "section 12" the colon should be a period. |
| 8 | 19 | "11" should be --1--. |
| 8 | 22 | "11" should be --1--. |
| 8 | 26 | "11" should be --1--. |
| 8 | 30 | "11" should be --1--. |

Signed and Sealed this

Fifteenth Day of September, 1992

*Attest:*

DOUGLAS B. COMER

*Attesting Officer*

*Acting Commissioner of Patents and Trademarks*